(12) United States Patent
Geng et al.

(10) Patent No.: US 12,099,456 B2
(45) Date of Patent: Sep. 24, 2024

(54) COMMAND PROCESSING CIRCUITRY MAINTAINING A LINKED LIST DEFINING ENTRIES FOR ONE OR MORE COMMAND QUEUES AND EXECUTING SYNCHRONIZATION COMMANDS AT THE QUEUE HEAD OF THE ONE OR MORE COMMAND QUEUES IN LIST ORDER BASED ON COMPLETION CRITERIA OF THE SYNCHRONIZATION COMMAND AT THE HEAD OF A GIVEN COMMAND QUEUE

(71) Applicant: Arm Limited, Cambridge (GB)

(72) Inventors: Guanghui Geng, Sheffield (GB); Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/098,360

(22) Filed: Jan. 18, 2023

(65) Prior Publication Data

US 2024/0241845 A1  Jul. 18, 2024

(51) Int. Cl.
*G06F 13/16* (2006.01)
*G06F 12/1027* (2016.01)
(Continued)

(52) U.S. Cl.
CPC ...... *G06F 13/1689* (2013.01); *G06F 12/1027* (2013.01); *G06F 12/1491* (2013.01); *G06F 13/225* (2013.01)

(58) Field of Classification Search
CPC ............. G06F 12/1027; G06F 12/1491; G06F 13/1689; G06F 13/225
See application file for complete search history.

(56) References Cited

U.S. PATENT DOCUMENTS

2021/0165682 A1* 6/2021 Xiao ..................... G06F 9/5027

* cited by examiner

*Primary Examiner* — Jane W Benner
(74) *Attorney, Agent, or Firm* — NIXON & VANDERHYE P.C.

(57) ABSTRACT

Circuitry comprises a memory to store data defining a set of one or more command queues each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the command queues which are earlier than the synchronization command in an execution order have completed; and command processing circuitry to execute the commands; in which the command processing circuitry is configured to maintain a linked list of entries having a list order, each entry defining a respective one of the command queues, in which the command processing circuitry is configured to execute commands at the head of command queues, the command queues being defined by prevailing entries of the linked list of entries in the list order; and in which, for a current occupancy of the linked list at a given stage, the given stage being a given stage of executing commands from command queues defined by entries of the linked list, the command processing circuitry is configured to execute a synchronization command first in the list order and to detect, within that current occupancy of the linked list at the given stage, any further synchronization commands at the head of command queues which are defined by entries of the linked list later in the list order, the command processing circuitry applying, for any such further synchronization commands, the completion criteria of the synchronization (Continued)

command at the head of a given command queue, the given command queue being defined by an entry of the linked list earliest in the list order so as to treat any such further synchronization commands as having been completed.

15 Claims, 6 Drawing Sheets

(51) Int. Cl.
*G06F 12/14* (2006.01)
*G06F 13/22* (2006.01)

COMMAND PROCESSING CIRCUITRY
MAINTAINING A LINKED LIST DEFINING
ENTRIES FOR ONE OR MORE COMMAND
QUEUES AND EXECUTING
SYNCHRONIZATION COMMANDS AT THE
QUEUE HEAD OF THE ONE OR MORE
COMMAND QUEUES IN LIST ORDER
BASED ON COMPLETION CRITERIA OF
THE SYNCHRONIZATION COMMAND AT
THE HEAD OF A GIVEN COMMAND
QUEUE

BACKGROUND

This disclosure relates to circuitry and methods.

It is known to provide command processing circuitry (for example though not exclusively in the context of a system memory management unit or SMMU) to queue and execute commands such as example commands relating to the maintenance of the SMMU. It is in the context of this type of arrangement that the present disclosure arises.

SUMMARY

In an example arrangement there is provided circuitry comprising:
 a memory to store data defining a set of one or more command queues each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the command queues which are earlier than the synchronization command in an execution order have completed; and
 command processing circuitry to execute the commands;
in which the command processing circuitry is configured to maintain a linked list of entries having a list order, each entry defining a respective one of the command queues, in which the command processing circuitry is configured to execute commands at the head of command queues, the command queues being defined by prevailing entries of the linked list of entries in the list order;
and in which, for a current occupancy of the linked list at a given stage, the given stage being a given stage of executing commands from command queues defined by entries of the linked list, the command processing circuitry is configured to execute a synchronization command first in the list order and to detect, within that current occupancy of the linked list at the given stage, any further synchronization commands at the head of command queues which are defined by entries of the linked list later in the list order, the command processing circuitry applying, for any such further synchronization commands, the completion criteria of the synchronization command at the head of a given command queue, the given command queue being defined by an entry of the linked list earliest in the list order so as to treat any such further synchronization commands as having been completed.

In another example arrangement there is provided a method comprising:
 storing data defining a set of one or more command queues each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the command queues which are earlier than the synchronization command in an execution order have completed;
 executing the commands;
 maintaining a linked list of entries having a list order, each entry defining a respective one of the command queues, in which the command processing circuitry is configured to execute commands at the head of command queues, the command queues being defined by prevailing entries of the linked list of entries for execution in the list order; and
 for a current occupancy of the linked list at a given stage, the given stage being a given stage of executing commands from command queues defined by entries of the linked list:
 executing a synchronization command first in the list order;
 detecting, within the given current occupancy of the linked list at the given stage, any further synchronization commands at the head of command queues which are defined by entries of the linked list later in the list order; and
 applying, for any such further synchronization commands, the completion criteria of the synchronization command at the head of a given command queue, the given command queue being defined by an entry of the linked list earliest in the list order so as to treat any such further synchronization commands as having been completed.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
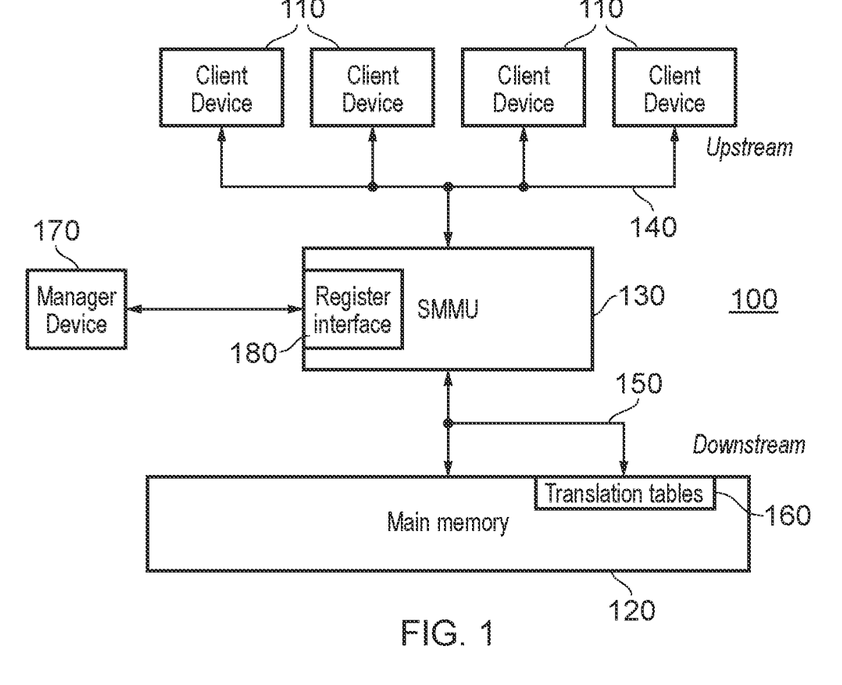
FIG. 1 schematically illustrates an example circuitry.

Referring now to the drawings, FIG. 1 schematically illustrates an example circuitry 100 in which one or more client devices 110 access a main memory 120 via memory management circuitry referred to here as a system memory management unit (SMMU) 130. The client devices 110 are connected to the SMMU 130 by interconnect circuitry 140 and the SMMU 130 is connected to the main memory 120 by interconnect circuitry 150. By way of terminology, the client devices are often described as being "upstream" of the SMMU 130 and the main memory is often described as being "downstream" of the SMMU 130.

The SMMU 130 provides memory address translation services in respect of memory accesses performed by the client devices. At a basic level, a client device executes an application comprising processing instructions, and as part of that execution memory accesses are required. As far as the client devices are concerned, such memory accesses are defined by virtual memory addresses (VA) in an address space applicable to that application, whereas the main memory 120 is accessible according to physical memory addresses (PA). Therefore, there is a need for translation of a VA to a PA. The translation process can provide a potentially improved level of security by denying individual applications direct access to physical memory.

In an example operation, a client device issues a transaction request involving a memory access to the SMMU 130. The SMMU 130 processes that transaction and returns a response to the client device which initiated that transaction request. In doing so, the SMMU 130 translates a VA defined by the transaction request into a corresponding PA, performs a memory access according to that PA and returns a result of that memory access to the initiating client device. The SMMU 130 can also establish (and act upon), as part of the translation process, access permissions and attributes relating to the requested memory access.

Note that from the point of view of the client device, an operation is performed according to addresses in an address space applicable to that operation, even though in the wider view of the system these are in fact VAs; transaction requests are routed from the client device and responses received. In other words, an application running on a given client device may not be aware that memory access is performed via the SMMU 130 and/or that any address translation even takes place.

Information defining such address translations is generally overseen by an operating system or hypervisor acting at a higher security level than the application. In some examples, such memory address translation information is provided as one or more so-called translation tables 160 stored in the main memory 120 (as an example of a translation information memory), for example comprising one or more hierarchies of so-called page tables. In order to generate an address translation, the SMMU 130 accesses the translation tables, for example by a hierarchical process often referred to as a "page table walk". As discussed below with reference to FIG. 2, the SMMU 130 may retain a local cache of memory address translations, for example in a so-called translation lookaside buffer (TLB) 210, as an example of a buffer to store information defining at least some memory address translations.

The SMMU 130 may be managed by software running on one or more manager devices 170. Communication with the SMMU 130, for the purposes of SMMU management, can be via a register interface 180, an example of which will be discussed further below.

Memory address translation may be performed as a single stage translation, for example from VA to PA, or in other examples as a multiple-stage translation such as a two-stage translation in which a VA is translated to, for example, an intermediate physical address or IPA, and the IPA is then subject to a separate address translation to a PA. This type of arrangement can allow for a hierarchical approach to security, in that VA to IPA translations may be overseen by an operating system, whereas IPA to PA translations may be overseen at a higher security level by a hypervisor.

Figure 2:
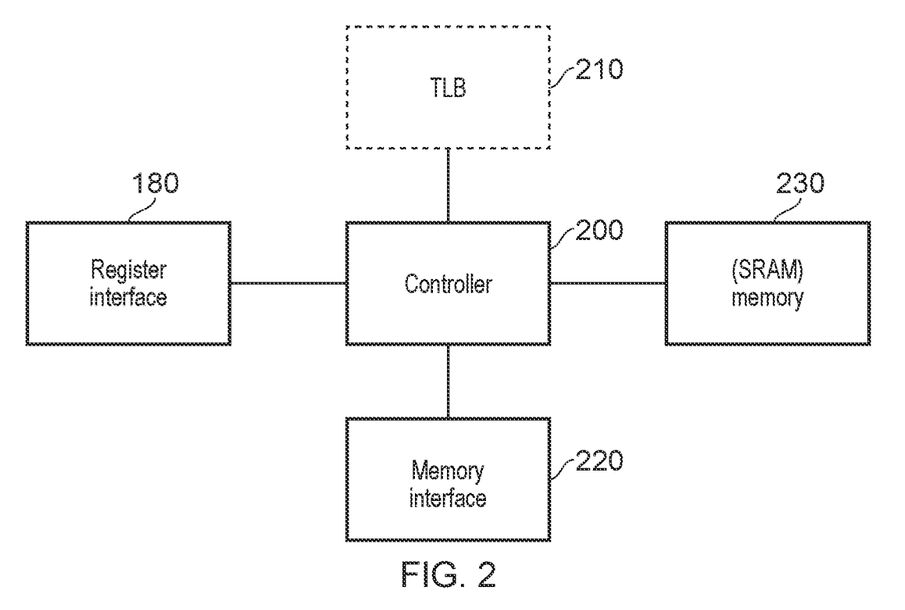
FIG. 2 schematically illustrates some aspects memory management circuitry.

FIG. 2 schematically illustrates aspects of the SMMU 130. A controller 200 is provided. This may be in the form of a dedicated processor which, for a routine memory address translation performs the page table walk process referred to above. The controller 200 also executes management commands to be discussed further below. The SMMU can comprise the TLB 210 in which translation information can be locally cached, a memory interface 220 for interfacing with the main memory 120 and a local memory 230, for example implemented as static random access memory (SRAM) circuitry. Note that the register interface 180 is drawn separately in FIG. 2 but may in fact be hosted or provided by a portion of the local memory 230.

As part of the management of the SMMU 130, software running on a manager device can provide so-called commands for execution by the controller 200 of the SMMU 130.

The commands may include the following:
a. Invalidation commands and Synchronization commands. An invalidation command, when executed, causes the controller 200 to invalidate one or more cached translations stored by the TLB 210. A synchronization command is used to provide synchronization of potentially multiple commands in progress, so that completion of a synchronization command is dependent upon one or more completion criteria indicating that all commands which are earlier than the synchronization command in an execution order have completed.
b. Translation type (retry a stall or terminate a stall). An attempted memory address translation may stall, for example because of delays or faults in obtaining the required information from the translation tables 160. A command for execution may either cause that stalled translation to be retried or cause that stalled translation to be terminated.
C. A response to a PCIe page request group. Here, a PCIe endpoint represents an endpoint defined by the PCI protocols (as an example client device). Such an endpoint may be capable of performing its own memory address translations and to this end may request that page tables are loaded into memory but that no further action is taken. Once the loading has completed, software running at a manager device can initiate a CMD_PRI_RESP command to inform that PCIe endpoint that it can retry its translation request.

The commands are handled by being added to one or more command queues by software running at a manager device. There can be multiple command queues potentially including one or more command queues 300 (FIG. 3) accessible by management software relating to any operating system, hypervisor or other software, and zero or more so-called enhanced command queues 310 each associated with management by a respective operating system, hypervisor or other software.

Figure 3:
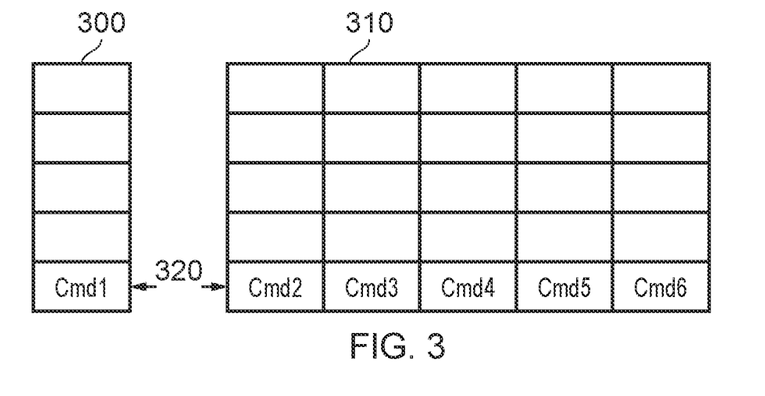
FIG. 3 schematically illustrates a set of command queues.

Therefore, in at least some example arrangements two types of command queues are provided: command queues 300 and enhanced command queues 310. The latter (enhanced command queues 310) may be present in large numbers—potentially in the thousands. The former (command queues 300) represent a legacy or previous architecture. In response to a need for more command queues, the enhanced command queues were implemented, while retaining the original command queues 300 to provide backwards compatibility with software relating to the earlier architecture. Generally speaking there is little or no difference between the use of command queues 300 and enhanced command queues 310 other than some minor error reporting and semantics about how to disable and enable the queues.

Each command queue is drawn as a vertical column in the representation of FIG. 3 and has a head 320 (drawn at the bottom of the respective column) representing a next command to be executed for that command queue. Commands at the head of each queue are shown schematically in FIG. 3 as Cmdn, where n is an index relating to each queue by virtue of its order in a linked list to be discussed below. The use of the generic indication "Cmdn" is in order to differentiate the different queues rather than implying that the respective commands at those queue positions are necessarily the same as one another. For a given queue, the command at the head of that queue is executed, and then as a next command for that queue the next following command (which will by then have become the command at the head of that command queue) is executed, and so on.

Figure 4:
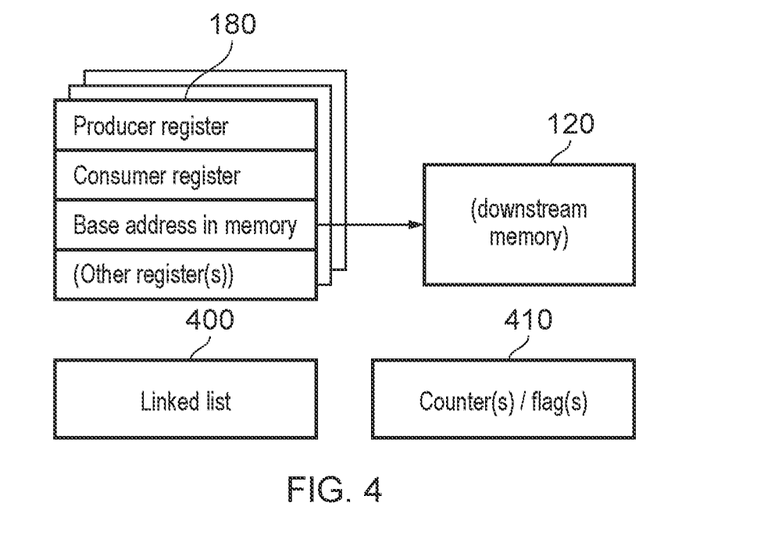
FIG. 4 schematically illustrates the storage of registers and a linked list.

FIG. 4 schematically illustrates an example of the manner in which commands may be organized at the SMMU 130. The register interface 180 provides at least the following registers in respect of each command queue in use: (a) a producer register; (b) a consumer register; (c) a register storing a base address in main memory. (Note that in some implementations the base address may indicate the start of the command queue in system memory and another parameter may indicate a maximum size of the queue starting from the base address, for example in order to make sure that a memory access to system memory to read commands from downstream memory does not go outside the memory allocation of the queue itself.)

The operating systems compete for access to the register interface 180 using arbitration techniques which may be external to the SMMU 130. An example is that the operating systems communicate with the register interface according to the so-called Advanced Microcontroller Bus Architecture (AMBA) Advanced Peripheral Bus (APB) protocol. This allows one instance of software (such as an operating system, hypervisor or the like) at a time to update the register interface 180.

In an example arrangement software such as an operating system or hypervisor would be running and would decide it wishes to execute a synchronization command. After the queue in system memory is updated, software would issue a LDR (load)+STR (store) instructions to modify the SMMU's registers. The address at which the STR would occur would trigger a AXI write towards the SMMU whilst also converting the access into APB for the SMMU.

To push a command to a command queue the respective operating system in control stores the command in the main memory and increments the producer register for that command queue. The producer register, taken with the base address, provide a location in the main memory at which the SMMU can locate that command. The base address and the consumer register together point to the head of that queue. The SMMU, after executing the command, increments the consumer register for that command queue.

The local memory 230 also hosts a linked list 400 and may host a set of counters/flags 410 (though in some examples these are held by flops—not shown but which may form part of the controller 200), both of which will be discussed further below. The use of the linked list provides oversight of the order by which commands are executed from the various command queues.

Commands for a given command queue are provided by a respective command source, which may comprise software executed by one or more processing elements (such as the manager device(s) 170 and/or the client device(s) 110) which may be configured to execute software at a security level selected from zero or more (for example two or more) security levels.

Figure 5:
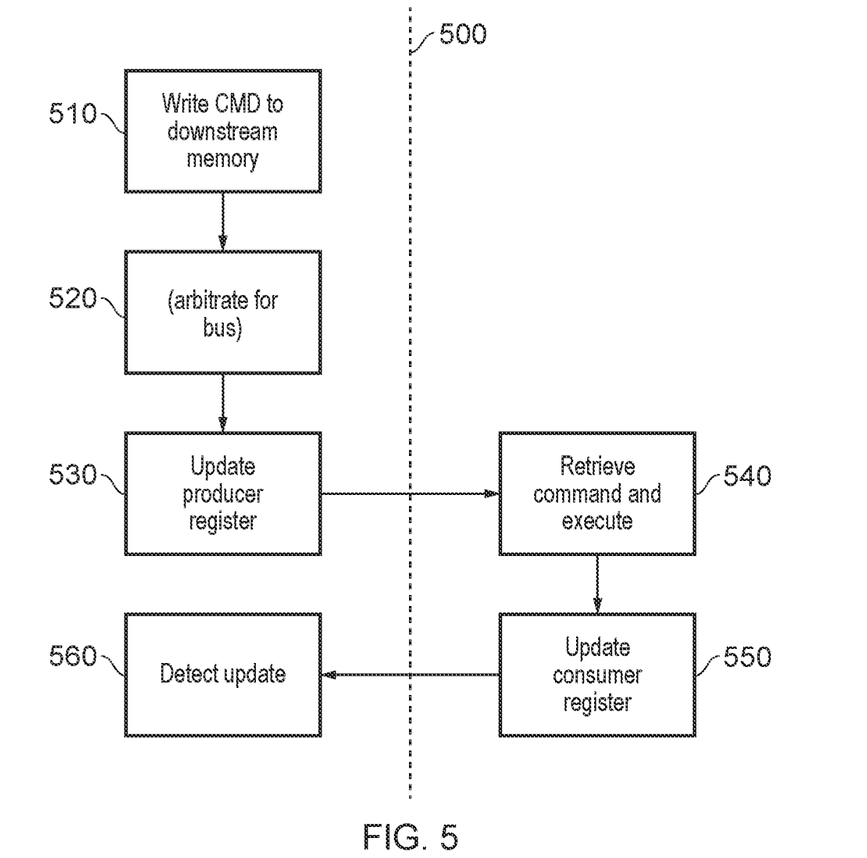
FIGS. 5 and 6 are schematic flowcharts illustrating respective methods.

FIG. 5 is a schematic flowchart illustrating process steps performed by the relevant software such as privileged software (steps to the left of a vertical broken line 500) and process steps performed by the controller 200 (steps to the right of the vertical broken line 500).

At a step 510, the software writes a command to an area of main (downstream) memory associated with the relevant command queue by virtue of the base address held in the register interface 180 for that command queue. The software arbitrates for bus communication with the register interface 180 at a step 520. As discussed above, this process may be performed externally to the SMMU 130, for example using AMBA APB techniques. When the manager device running the relevant software wins the arbitration it is then able to update the producer register of the register interface 180 at a step 530. For example, the software may increment the producer register.

At the relevant stage for execution of a command from this command queue (as determined by the controller 200 with reference to the linked list to be discussed below) the controller 200 retrieves the command at a step 540 and executes it. The retrieval of the command is performed by the controller 200 by accessing at least the base address register and the consumer register to derive an address in the main memory from which the command is to be retrieved. For example, the address in main memory may be equal to (base address+(size in memory of one command * (value stored in consumer register))). Once the controller 200 has executed the command, it updates the consumer register for that command queue at a step 550, for example by incrementing the consumer register. A difference between the value stored by the producer register and the consumer register represents a number of commands waiting for execution in that command queue. A difference of zero indicates that the command queue is currently empty. Finally, at a step 560, the software may poll the consumer register to detect that the consumer register has been updated, thereby indicating execution of the command. (Note that in some examples a notification of completion of a synchronization operation can be provided as an interrupt or other event).

Figure 6:
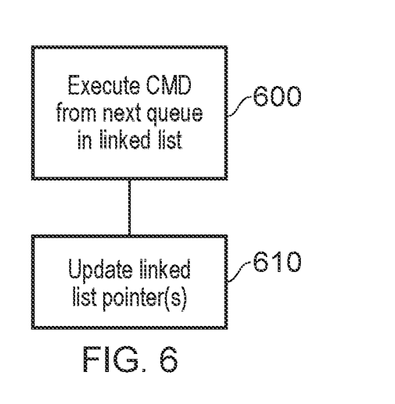

FIG. 6 provides an overview of the use of linked lists.

The linked list provides an ordered set of entries stored and maintained by the controller 200 in the memory 230. Each entry defines a command queue, and for example may include pointers to the memory 230 storing the register interface for that command queue (including for example the producer register, the consumer register and the base address for that command queue). These parameters from the register interface in turn provide a pointer (to main memory) to the next command to be executed, which is to say the head of the relevant command queue. But the linked list itself is a linked list of all of the command queues which—at least a time of sampling—contain commands to be executed rather than a list of commands. Execution of the commands follow the successive ordering of command queues defined by the linked list. The last or tail entry in the linked list was a last entry at the time that the linked list was established; in some examples on reaching the tail entry the linked list is resampled to detect command queues having commands to be executed, and execution then continues from the new head of the linked list (though it is also possible that the linked list contains no further command queues with commands to be executed). In other examples, queues may be continually added to the linked list (if they were not already present in the linked list), although the synchronization operation merging techniques described below may still make use of a theoretical snapshot of the linked list. As execution progresses to a next command queue in the list order, if that command queue contains a command awaiting execution at the head of that command queue, that command will be executed. If there are no command queues with commands waiting to be processed, then this may be indicated to clock and power controllers outside of the SMMU to indicate that power and/or clock are not currently required.

In more detail relating to some examples, a linked list entry may hold or point to the producer register, the consumer register and the base address register along with a next pointer (nxt_ptr) for a next linked list entry. For each command queue that is popped from the linked list a value is stored indicating how many commands are currently outstanding for that command queue. Due to the potential use of a prefetch process, it is possible to fetch multiple commands, potentially from multiple command queues, without necessarily even processing some of them; instead they can potentially be buffered until it is possible or appropriate to process them. Thus a number of counters can indicate how many commands are outstanding for the current ongoing command queues; the counter value for a command queue can be added to the consumer register to indicate where to fetch the next command from, because it may not always be appropriate to fetch from the head of the command queue because that command may already have been fetched.

The controller 200 adds a command queue to the linked list (for example, at the current tail or end of the linked list at the time of adding that command queue) when that command queue is detected to have a command to be executed (for example, by a comparison of the consumer and producer registers).

Each linked list entry comprises or defines an indication of a next entry in the linked list. As part of execution of the commands, the controller 200 maintains (in flops or in the memory 230) a linked list pointer. This indicates, within the set of entries of the linked list, a next entry for which a command in the corresponding queue is to be executed. The linked list pointer is updated by one entry at each command execution cycle.

Referring to FIG. 6, at a step 600 the controller 200 accesses and executes the next command from the next command queue defined by the linked list entry pointed to by the linked list pointer. Note that a linked list of command queues might not always contain a queue's head command. The head command might be being executed currently and whilst that's happening a detection is made that there are even more commands needed to be processed and thus push the command queue into the linked list again. This is called prefetch. Thus the linked list may contain pointers for the next command after the head one.

At a step 610 the controller 200 updates the linked list pointer using information from the linked list entry just accessed, so as to advance to the next entry in the linked list. Therefore, the memory 230 provides an example of a memory to store data (such as base address, consumer register and producer register) defining a set of one or more (for example, two or more) command queues each associated with a respective memory address space, each command queue defining successive commands for execution from a queue head to a queue tail. Note that in some examples, this manner of handling the linked list(s) may refer to enhanced command queues (so that in other words the circuitry is responsive to a set of one or more command queues comprises one or more enhanced command queues each associated with management by a respective operating system, hypervisor or other software, and in which the circuitry is responsive to one or more further command queues accessible by management software relating to any operating system, hypervisor or other software.)

In more detail:

In some examples, enhanced command queues 310 are all in a RAM that contains a linked list just for them. But other command queues 300 are inserted in an artificial manner into a pseudo linked list.

The enhanced command queues 310 get pushed into the RAM based linked list as and when it is detected that there are commands to be processed for them and a count is kept of how many items are in the RAM based enhanced command queue linked list (1 counter per security).

Then when it is detected that there are commands to process for the command queues 300, a snapshot is taken of the occupancy of the enhanced command queue RAM linked list counter for that security and count down from there the number of pops that are made to the ECMDQ linked list.

When that counter reaches 0, the command queue 300 is given priority to have its command fetched and executed.

Once the command queue 300 is granted (it is not necessary to wait for it to start having its command fetched from downstream), priority is again reset to the enhanced command queue linked lists.

Then again when the command queue 300 has a command that needs processing a snapshot is again taken of the number of queues in that enhanced command queue RAM linked list and count down to 0. When that counter reaches 0, priority is given to the command queue 300 to be granted through an arbiter. Once granted, priority resets to enhanced command queue.

Figure 7:
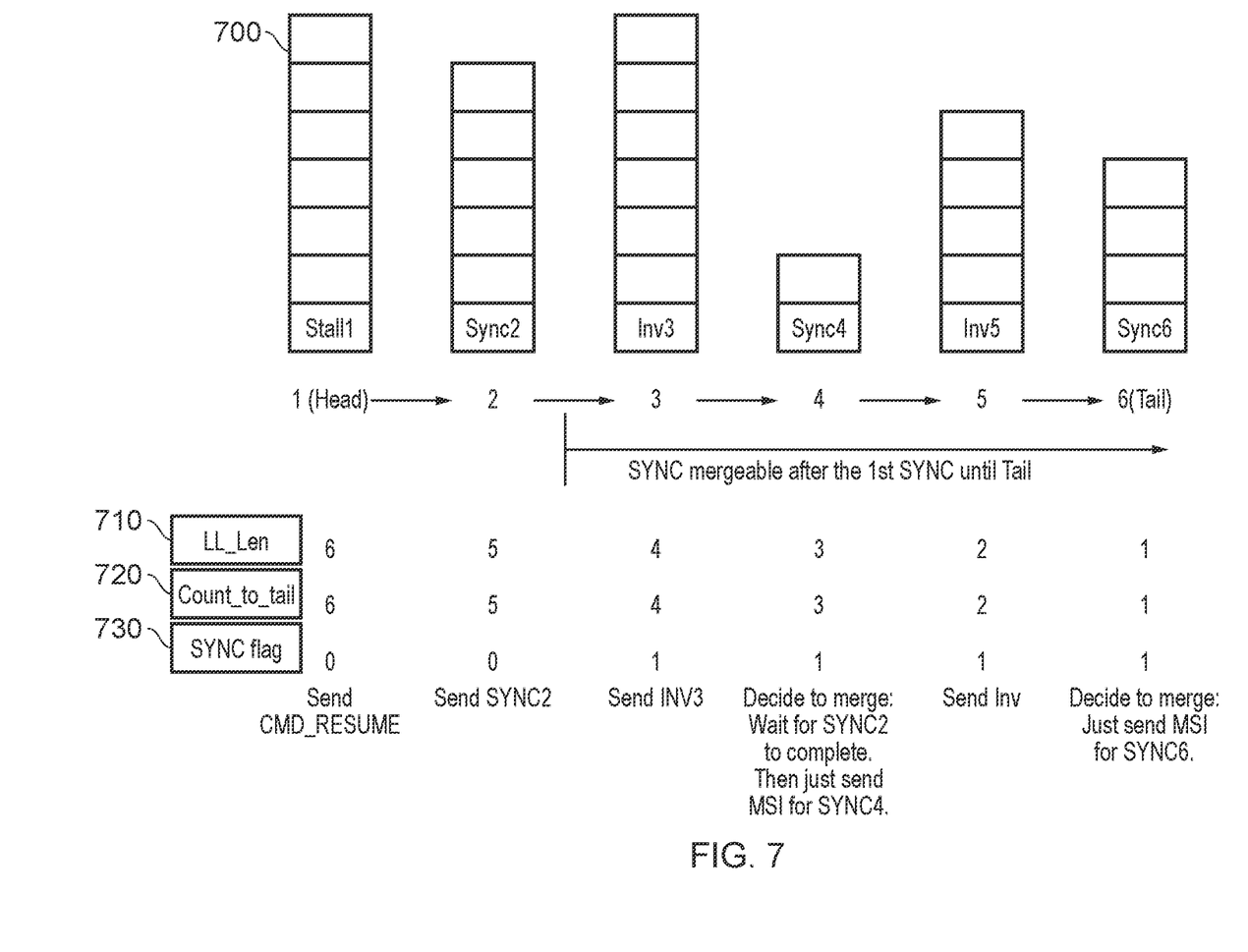
FIGS. 7 and 8 schematically illustrate aspects of linked list handling.
Figure 8:
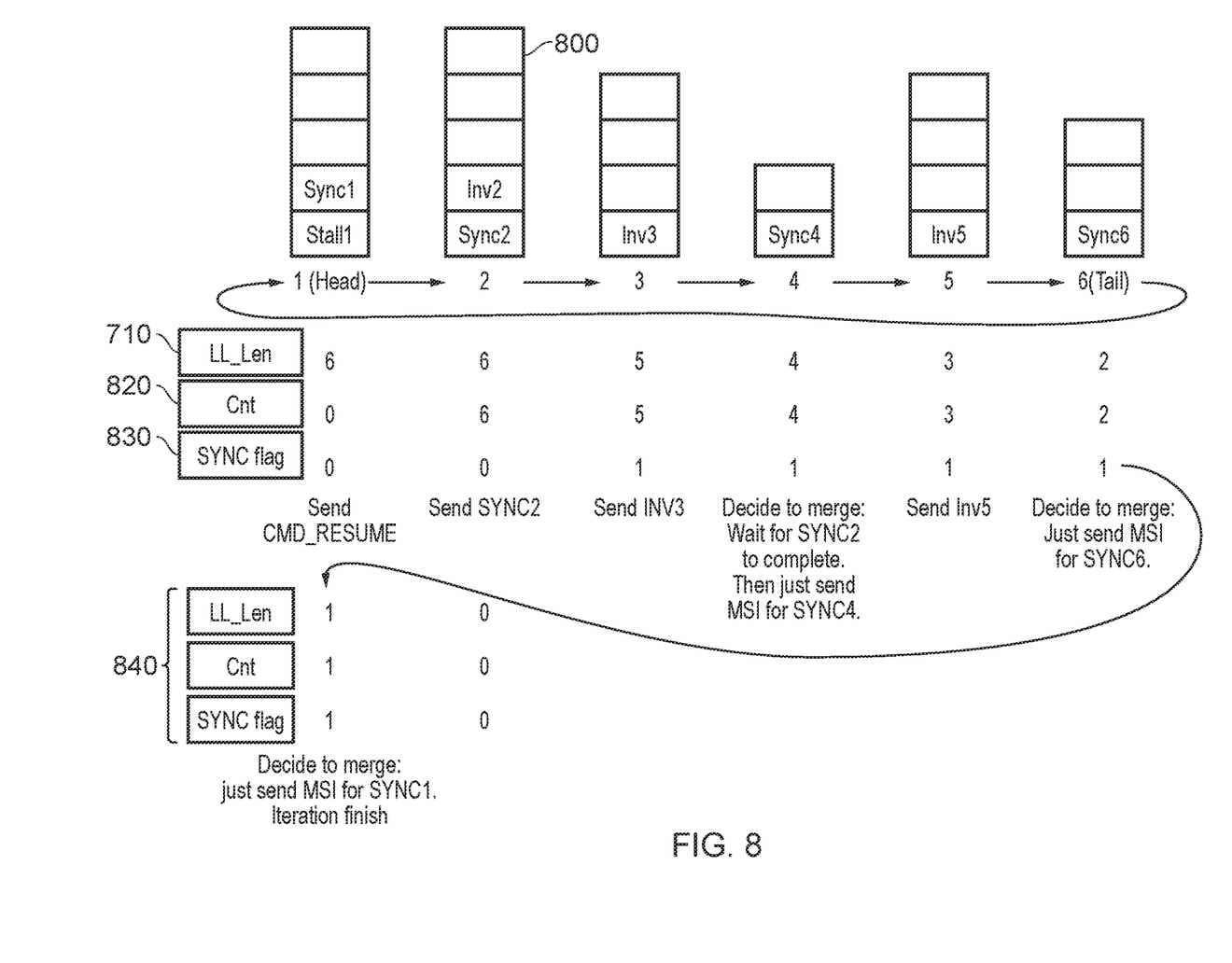

FIGS. 7 and 8 schematically represent two examples of the handling of commands in the command queues defined by the linked list entries. In each of FIGS. 7 and 8, six example queues 700, 800 (formed as one or more command queues 300 (FIG. 3) accessible by management software relating to any operating system, and zero or more enhanced command queues 310) are illustrated as vertical columns. An example linked list of six entries is represented, numbered in this example from 1 to 6, with entry 1 being the head of the linked list and entry 6 being the tail of the linked list. Each linked list entry is drawn underneath the respective queue, and further information (to be discussed below in more detail) relevant to execution of the command at the head of that queue is shown beneath the linked list entry.

The linked list is traversed (in this example) in ascending numerical order of entry number, so that for example a linked list pointer (as mentioned above) is incremented at each command execution cycle until it reaches the tail entry in the linked list. This represents an example of the linked list having a list order.

A variable LL_len (linked list length) 710 is maintained by the controller 200 (for example in the memory 230 or in other examples held by flops—not shown) and represents the prevailing length of the linked list remaining to be executed (as detected by controller 200); in this example it starts at 6 and counts down. Other variables maintained by the controller 200 and stored (for example, by the memory 230 or in other examples held by flops—not shown) include a counter 720, 820 and a SYNC flag 730, 830.

The commands in the command queues 700, 800 are suffixed by the respective number of the linked list entry pointing to that command queue. The bottom of each command queue (as drawn) represents the head of that command queue, or the next command to be executed. Blank entries are shown higher in the queues as drawn, but this does not necessarily imply that the queue is empty at those positions (though this may actually be the case), but rather that the contents (representing the nature of any queued commands at those command queue positions) are simply not relevant to the discussion of FIGS. 7 and 8 below. Note that if commands were present at the blank positions, then once the current command gets executed, that queue would be added back at the tail of the linked list.

The example commands shown in FIGS. 7 and 8 include the following:

Inv: an invalidation command, which may define by command parameters (not shown in FIGS. 7 and 8) one or more TLB entries to be invalidated; in response to this command, the controller 200 "sends" or executes an invalidation operation.

Sync: a synchronization command; execution of a synchronization command includes, as a late or final stage, sending one or more interrupts (such as so-called message-signaled interrupts or MSIs), for example to circuitry executing the software associated with providing commands to that command queue; and Stall: a stall retry command; in response to this the controller 200 sends or executes a CMD_RESUME (resume or retry) operation.

Other commands such as the example commands discussed earlier may be executed and/or be present in the command queues. These commands are shown merely as examples. The synchronization commands are particular examples given that some of the present techniques relate to the handling of synchronization commands.

The sending of interrupts as discussed above provides an example in which, in response to completion of a synchronization command, the controller 200 (as an example of command processing circuitry) may optionally be configured to issue one or more interrupts to the one or more processing elements which executed the software to provide that synchronization command.

Therefore, in these examples, the commands are selected from a set of commands comprising synchronization commands and one or more other commands defining memory management operations for a given memory address space, in which completion of a synchronization command is dependent upon one or more completion criteria indicating that all commands from any of the command queues which are earlier than the synchronization command in an execution order have completed. The memory management operations may for example comprise one or more operations from the list consisting of: an operation to invalidate an instance of translation information; an operation to provide information to allow the loading, into the translation information memory, memory address translation information defining a given memory address translation specified by the operation and to return an indication of completion of the loading into the translation information memory; and an operation to terminate or resume a memory address translation operation after that memory address translation operation has been stalled.

Example—FIG. 7

A first example of the present techniques is shown schematically in FIG. 7.

The linked list length LL_len in this example is 6. The controller maintains a counter 720 indicating a number of linked list entries remaining until the tail of the linked list is reached. For the example LL_len of 6, this counter starts at 6 when execution is at the head of the linked list and counts down to 1 when the tail of the linked list is reached.

As the linked list is traversed from the head to the tail, a synchronization command encountered first in that traversal is fully executed. Such a synchronization command will be referred to as a synchronization command "first in the list order". In other words, the term "first" indicates that it is a first-encountered synchronization command (and indeed may follow other non-synchronization commands in the list order) rather than it being a command from a command queue which itself precedes other command queues in the list order. In this example such a synchronization command first in the list order is Sync2. Sync2 is executed and, as a late or final part of its execution, interrupts associated with Sync2 are issued. The SYNC flag 730 is set (for example being set to "1" from an initial (unset) state of "0", though of course the other polarity or another representation could instead be used to represent a set state for the SYNC flag). in this example the SYNC flag is maintained as "set" until the tail of the linked list is reached, or in other words until the counter 720 reaches 1. At this stage the SYNC flag is unset ready for a next traversal of the linked list.

While the SYNC flag is set, this indicates that a synchronization command (in this example, Sync2) has already been executed—or at least execution has been initiated—in the current traversal of the linked list. In response to this state, the controller 200 is configured to "merge" any synchronization commands such as Sync4 subsequently encountered during that same traversal of the linked list (that is to say, while the SYNC flag remains set). Here, merging implies for example not executing the newly encountered synchronization command, but rather waiting for the earlier-encountered synchronization command (Sync2) to complete, and then simply sending any interrupts that would routinely be sent at the completion of that newly encountered synchronization command (Sync4). The SYNC flag continues to be set; as discussed above, it is not unset until the whole linked list has been traversed.

Similarly, when Sync6 is encountered, the SYNC flag's state is "set" and so Sync6 is merged or not executed, other than to send any interrupts associated with Sync6 once the first-encountered synchronization command Sync2 has completed.

In the example shown in FIG. 7, there are three synchronization commands Sync2, Sync4 and Sync6, in the context of a schematic example linked list of six entries (associated with six command queues). In a practical system, however, the command queues may be associated with the security levels in use so as to provide, for a given command source, a respective command queue for each security level, and indeed there could potentially be several thousand command queues for each security level, and any of these command queues could contain a synchronization command at the head of that command queue. Where multiple security levels are in use, a respective linked list may be provided at each security level.

Example—FIG. 8

A further example of the present techniques is shown schematically in FIG. 8.

As before, the linked list length LL_len is 6.

As the linked list is traversed from the head to the tail, a synchronization command encountered first is fully executed. In this example this is Sync2.

In response to initiation of execution of Sync2, the controller (a) sets the SYNC flag 830, and (b) initializes a counter 820 to LL_len and which counts down by one at each command execution cycle. In this example the counter 820 is initialized to 6 and counts down to 1. The SYNC flag is unset when the counter 820 reaches 1.

This implies that Sync4 and Sync6 are merged in the same way as that described with reference to FIG. 7, because they are encountered during the traversal of the linked list while the SYNC flag is set.

But in contrast to FIG. 7, the SYNC flag is not necessarily unset on reaching the tail of the linked list; instead, because the counter 820 was initialized to LL_len when the first synchronization command was encountered, and because the SYNC flag is not unset until the counter 820 reaches 1, the SYNC flag potentially remains set as the linked list continues execution from a newly established head of the linked list.

By now, the command which was initially at the head of the command queue 1 (Stall1) has already been executed, so in the second pass through the linked list (as represented by a region 840 of FIG. 8) the head of the command queue 1 is an instruction Sync1. Because the SYNC flag is still set, this synchronization instruction is also merged with Sync2 and not executed apart from sending its interrupts.

The SYNC flag is then unset in response to the counter 820.

By way of a summary, in FIG. 7 the SYNC flag is set (leading to the merging of subsequently encountered synchronization instructions) for the remainder of the current traversal of the linked list and is then unset for the next or following traversal from the head of the linked list. In contrast, in FIG. 8, the SYNC flag is kept as set (similarly leading to the merging of subsequently encountered synchronization commands) for a number of linked list entries equal to the length LL_len of the linked list. In other words, in FIG. 8, the SYNC flag is set in response to execution of a synchronization instruction at a given command queue (say, command queue n) which is the first-encountered synchronization command while the SYNC flag is in the unset state, and any synchronization commands encountered during traversal of the linked list are merged, up to and including the entry preceding the linked list entry for command queue n.

In summary, for a current occupancy of the linked list at a given stage, the given stage being a given stage of executing commands from command queues defined by entries of the linked list, the command processing circuitry is configured to execute a synchronization command first in the list order and to detect, within that current occupancy of the linked list at the given stage, any further synchronization commands at the head of command queues which are defined by entries of the linked list later in the list order, the command processing circuitry applying, for any such further synchronization commands, the completion criteria of the synchronization command at the head of a given command queue, the given command queue being defined by an entry of the linked list earliest in the list order so as to treat any such further synchronization commands as having been completed.

In the case of the example of FIG. 7, the given stage comprises execution of a command from a command queue defined by a first entry of the linked list.

In the case of the example of FIG. 8, the given stage comprises execution of a synchronization command (for example a first-encountered synchronization command while the SYNC flag is unset).

Example arrangements as discussed here can provide a performance improvement as in some instances fewer synchronization commands may need to be executed; when a "further" synchronization command for a command queue later in the linked list order is encountered after a synchronization command for a queue earlier in the linked list order has been executed, it is treated as having been completed and the processing for that later synchronization command can be reduced (in some examples, only one or more interrupts need to be issued).

Apparatus Example

In summary, FIG. 2 provides an example of circuitry comprising:

a memory 230 to store data defining a set of one or more command queues (though note that the command queues themselves may be stored in main memory accessible via the memory interface 220) each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the command queues which are earlier than the synchronization command in an execution order have completed; and command processing circuitry 200 to execute the commands;

in which the command processing circuitry is configured to maintain a linked list of entries having a list order, each entry defining a respective one of the command queues, in which the command processing circuitry is configured to execute commands at the head of command queues, the command queues being defined by prevailing entries of the linked list of entries in the list order;

and in which, for a current occupancy of the linked list at a given stage, the given stage being a given stage of executing commands from command queues defined by entries of the linked list, the command processing circuitry is configured to execute a synchronization command first in the list order and to detect, within that current occupancy of the linked list at the given stage, any further synchronization commands at the head of command queues which are defined by entries of the linked list later in the list order, the command processing circuitry applying, for any such further synchronization commands, the completion criteria of the synchronization command at the head of a given command queue, the given command queue being defined by an entry of the linked list earliest in the list order so as to treat any such further synchronization commands as having been completed.

Method Example

Figure 9:
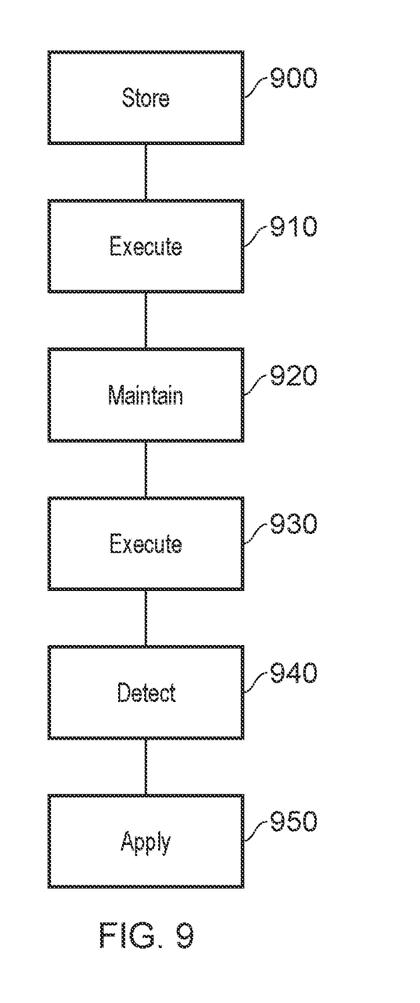
FIG. 9 is a schematic flowchart illustrating a method.

FIG. 9 is a schematic flowchart illustrating a method comprising:

storing (at a step 900) data defining a set of one or more command queues each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the command queues which are earlier than the synchronization command in an execution order have completed;

executing (at a step 910) the commands;

maintaining (at a step 920) a linked list of entries having a list order, each entry defining a respective one of the command queues (whether directly or indirectly, for example by defining an interface to a respective command queues), in which the command processing circuitry is configured to execute commands at the head of command queues, the command queues being defined by prevailing entries of the linked list of entries for execution in the list order; and for a current occupancy of the linked list at a given stage, the given stage being a given stage of executing commands from command queues defined by entries of the linked list:

executing (at a step 930) a synchronization command first in the list order;

detecting (at a step 940), within the given current occupancy of the linked list at the given stage, any further synchronization commands at the head of command queues which are defined by entries of the linked list later in the list order; and applying (at a step 950), for any such further synchronization commands, the completion criteria of the synchronization command at the head of a given command queue, the given command queue being defined by an entry of the linked list earliest in the list order so as to treat any such further synchronization commands as having been completed.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. Circuitry comprising:
a memory to store data defining a set of one or more command queues each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the one or more command queues which are earlier than the synchronization command in an execution order have completed; and
command processing circuitry to execute the commands;
in which the command processing circuitry is configured to maintain a linked list of entries having a list order, each entry defining a respective one of the one or more command queues, in which the command processing circuitry is configured to execute commands at the queue head of the one or more command queues, the one or more command queues being defined by prevailing entries of the linked list of entries in the list order;
and in which, for a current occupancy of the linked list at a given stage of executing commands from the one or more command queues defined by entries of the linked list, the command processing circuitry is configured to execute a first synchronization command earliest in the list order and to detect, within that current occupancy of the linked list at the given stage, any further synchronization commands at the queue head of the one or more command queues which are defined by entries of the linked list later in the list order, the command processing circuitry applying, for any such further synchronization commands, the completion criteria of the synchronization command at the head of a given command queue, the given command queue being defined by an entry of the linked list earliest in the list order so as to treat the further synchronization commands as having been completed.

2. The circuitry of claim 1, in which the given stage comprises execution of a first command corresponding to a first entry of the linked list.

3. The circuitry of claim 1, in which the given stage comprises execution of a synchronization command.

4. The circuitry of claim 1, in which each respective command queue is associated with a command source to provide commands to that respective command queue.

5. The circuitry of claim 4, in which the command source comprises software executed by one or more processing elements.

6. The circuitry of claim 5, in which, in response to completion of the synchronization command, the command processing circuitry is configured to issue one or more interrupts to the one or more processing elements which executed the software to provide the synchronization command.

7. The circuitry of claim 6, in which the one or more processing elements are configured to execute software at a security level selected from two or more security levels.

8. The circuitry of claim 7, in which each of the command queues are associated with the two or more security levels so as to provide, for a given command source, a respective command queue for each security level.

9. The circuitry of claim 1, in which the command processing circuitry is configured to access a translation information memory storing memory address translation information.

10. The circuitry of claim 9, in which the memory address translation information comprises one or more hierarchies of page tables.

11. The circuitry of claim 9, comprising a translation lookaside buffer to store information defining at least some memory address translations.

12. The circuitry of claim 9, in which the memory management operations comprise one or more operations from the list consisting of:
- an operation to invalidate an instance of translation information;
- an operation to provide information to allow the loading, into the translation information memory, memory address translation information defining a given memory address translation specified by the operation and to return an indication of completion of the loading into the translation information memory;
- an operation to terminate or resume a memory address translation operation after that memory address translation operation has been stalled.

13. The circuitry of claim 1, in which the set of one or more command queues comprises a set of two or more command queues.

14. The circuitry of claim 13, in which the set of one or more command queues comprises one or more enhanced command queues each associated with management by a respective operating system, hypervisor or other software, and in which the circuitry is responsive to one or more further command queues accessible by management software relating to any operating system, hypervisor or other software.

15. A method comprising:
storing data defining a set of one or more command queues each associated with a respective memory address space, each command queue defining successive commands for execution from a queue head to a queue tail, the commands being selected from a set of commands comprising synchronization commands and one or more other commands defining memory management operations for a given memory address space, in which completion of a synchronization command is dependent upon one or more completion criteria indicating that all commands from any of the one or more command queues which are earlier than the synchronization command in an execution order have completed;

executing the commands;

maintaining a linked list of entries having a list order, each entry defining a respective one of the one or more command queues, in which the command processing circuitry is configured to execute commands at the queue head of the one or more command queues, the one or more command queues being defined by prevailing entries of the linked list of entries for execution in the list order; and for a current occupancy of the linked list at a given stage of executing commands from command queues defined by entries of the linked list:

executing a first synchronization command earliest in the list order;

detecting, within the given current occupancy of the linked list at the given stage, any further synchronization commands at the queue head of the one or more command queues which are defined by entries of the linked list later in the list order; and applying, for any such further synchronization commands, the completion criteria of the synchronization command at the head of a given command queue, the given command queue being defined by an entry of the linked list earliest in the list order so as to treat the further synchronization commands as having been completed.

* * * * *